(12) United States Patent
Kanou et al.

(10) Patent No.: US 8,876,400 B2
(45) Date of Patent: Nov. 4, 2014

(54) THRUST ROLLER BEARING AND METHOD FOR MANUFACTURING THRUST RACE THEREOF

(75) Inventors: Kazuhiko Kanou, Gunma (JP); Tetsuya Takahashi, Gunma (JP)

(73) Assignee: NSK Ltd., Tokyo (JP)

( * ) Notice: Subject to any disclaimer, the term of this patent is extended or adjusted under 35 U.S.C. 154(b) by 385 days.

(21) Appl. No.: 13/060,709

(22) PCT Filed: Feb. 24, 2010

(86) PCT No.: PCT/JP2010/052901
§ 371 (c)(1),
(2), (4) Date: Feb. 25, 2011

(87) PCT Pub. No.: WO2010/122838
PCT Pub. Date: Oct. 28, 2010

(65) Prior Publication Data
US 2011/0158573 A1    Jun. 30, 2011

(30) Foreign Application Priority Data

Apr. 20, 2009 (JP) ................ 2009-102011
Jul. 28, 2009 (JP) ................ 2009-175081

(51) Int. Cl.
*F16C 33/58* (2006.01)
*F16C 43/04* (2006.01)
*F16C 19/30* (2006.01)
*F16C 33/64* (2006.01)
*F16C 35/06* (2006.01)
*B23P 15/00* (2006.01)

(52) U.S. Cl.
CPC ............ *F16C 19/305* (2013.01); *F16C 33/588* (2013.01); *F16C 19/30* (2013.01); *F16C 33/64* (2013.01); *F16C 35/06* (2013.01); *B23P 15/003* (2013.01)

USPC ............................................ 384/622; 384/620

(58) Field of Classification Search
CPC ........ F16C 19/30; F16C 33/588; F16C 35/06; F16C 33/605
USPC ......... 384/420, 424, 425, 426, 615, 617, 618, 384/620, 621, 622
See application file for complete search history.

(56) References Cited

U.S. PATENT DOCUMENTS 3,900,235 A * 8/1975 Alling et al. ............... 384/622
4,783,183 A * 11/1988 Gardella .................... 384/620
(Continued)

FOREIGN PATENT DOCUMENTS

DE  10227377 A1  1/2004
JP  59-024530 U  2/1984
(Continued)

*Primary Examiner* — James Pilkington
*Assistant Examiner* — Adam D Rogers
(74) *Attorney, Agent, or Firm* — Sughrue Mion, PLLC

(57) ABSTRACT

A thrust race of a thrust roller bearing has a race portion and a cylindrical portion extending from the race portion in an axial direction. At a plurality of locations along a circumferential direction on the cylindrical portion, cutout portions are formed such that each of the cutout portions is recessed in the axial direction from a distal edge of the cylindrical portion toward the race portion. A protrusion is provided at a portion closer to the race portion from a bottom edge of each of the cutout portions such that the protrusion protrudes in a radial direction from the cylindrical portion toward a side away from the race portion. The protrusion serves as a race-retaining locking portion to prevent a race from moving out from a mating member on which the race is mounted.

2 Claims, 17 Drawing Sheets

(56) References Cited

U.S. PATENT DOCUMENTS

| | | | |
|---|---|---|---|
| 4,981,373 A * | 1/1991 | Bando | 384/620 |
| 5,158,375 A * | 10/1992 | Uchida et al. | 384/455 |
| 5,647,675 A | 7/1997 | Metten et al. | |
| 5,967,673 A * | 10/1999 | Kenney et al. | 384/620 |
| 6,830,381 B2 * | 12/2004 | Schwab et al. | 384/620 |
| 6,945,700 B2 | 9/2005 | Fugel et al. | |
| 7,318,676 B2 * | 1/2008 | Fugel et al. | 384/620 |
| 8,348,515 B2 * | 1/2013 | Fugel et al. | 384/620 |

FOREIGN PATENT DOCUMENTS

| | | |
|---|---|---|
| JP | 2003-247624 A | 9/2003 |
| JP | 2007-040498 A | 2/2007 |
| JP | 3971626 B2 | 9/2007 |

* cited by examiner

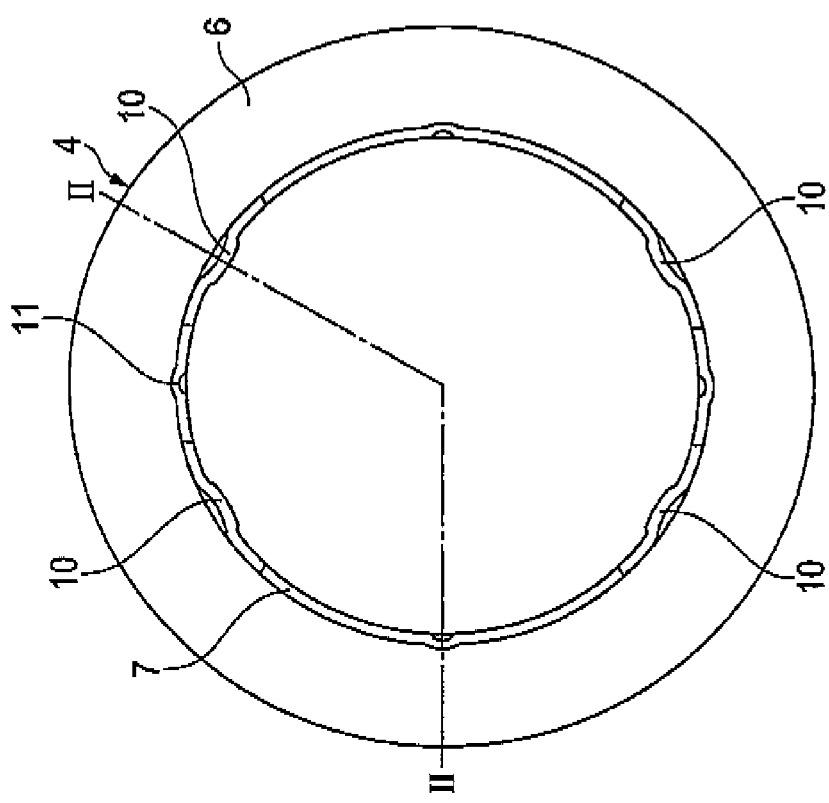

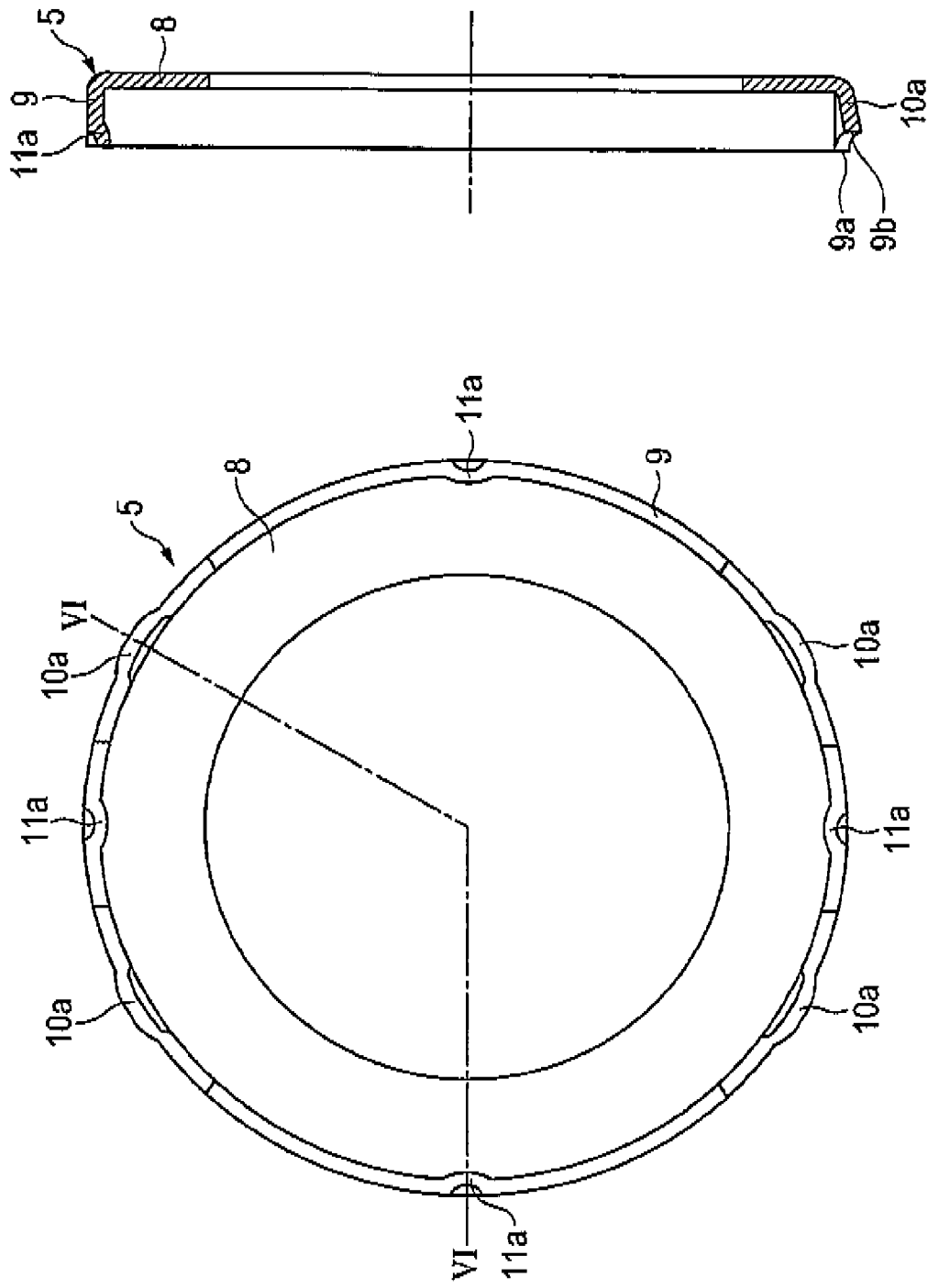

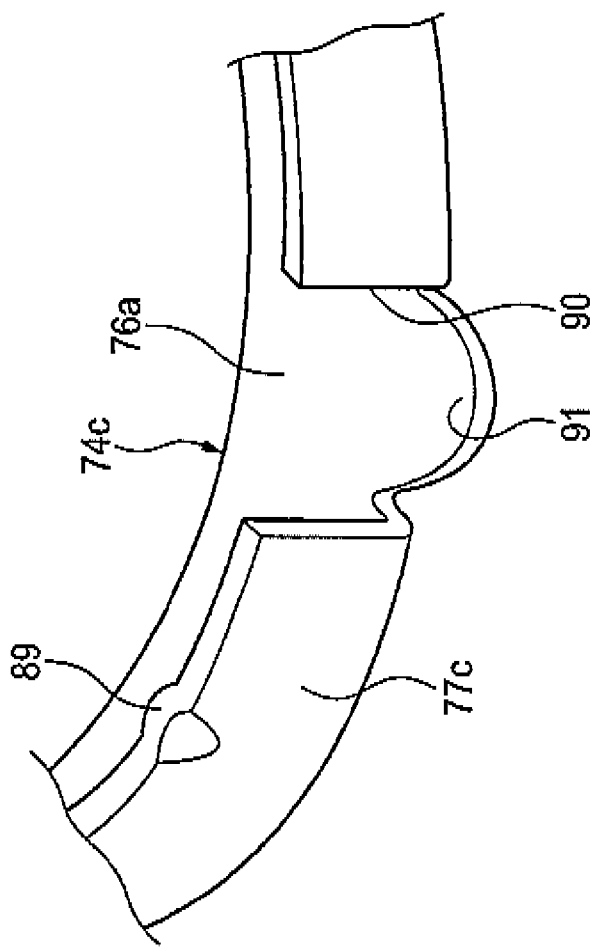

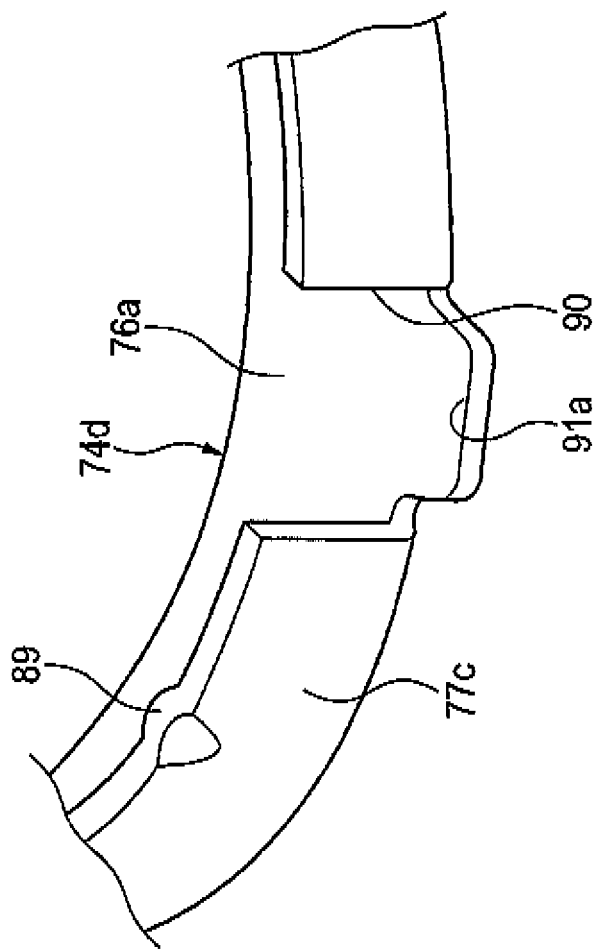
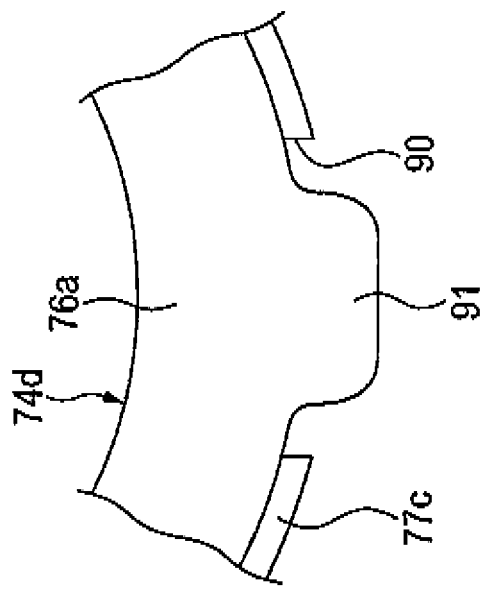
FIG. 10A
FIG. 10B

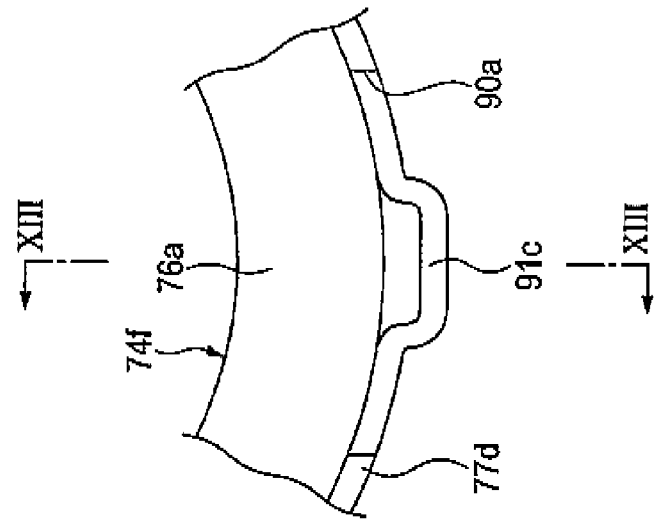
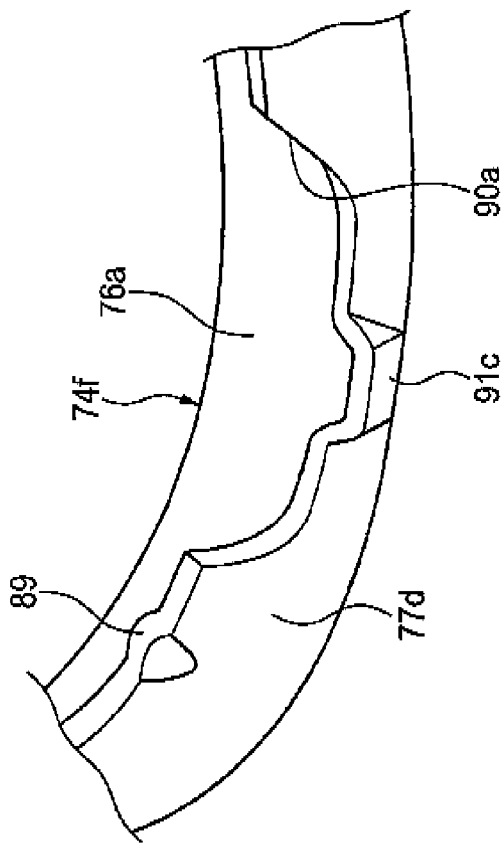
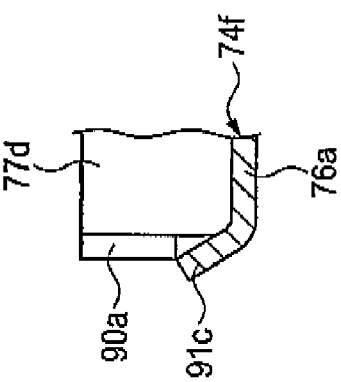

THRUST ROLLER BEARING AND METHOD FOR MANUFACTURING THRUST RACE THEREOF

CROSS REFERENCE TO RELATED APPLICATIONS

This application is a National Stage of International Application No. PCT/JP2010/052901 filed Feb. 24, 2010, claiming priority based on Japanese Patent Application Nos. 2009-102011, filed Apr. 20, 2009 and 2009-175081 filed Jul. 28, 2009, the contents of all of which are incorporated herein by reference in their entirety.

TECHNICAL FIELD

The present invention relates to a thrust roller bearing which is mounted in rotation support portion of a car auxiliary machine such as a transmission of a car, a an compressor for an air conditioner of a car, etc., or of various machines for general industrial use, to support a thrust load applied to the rotation support portion, and to a method for manufacturing a thrust race thereof. Here, a thrust roller bearing, which is disclosed in the present specification and in the appended patent claims thereof, includes a thrust needle bearing using a roller (needle) the axial length of which is larger than the diameter thereof (that is, the aspect ratio of which is large).

BACKGROUND ART

In the rotation support portion of various machines such as a transmission for use in a car, there is mounted a thrust roller bearing. For example, in the case of the car transmission, between a step portion provided in a rotary shaft and the axial end face of a gear disposed in the periphery of the rotary shaft, there is mounted a thrust roller bearing, whereby, while the thrust roller bearing is used to support a thrust load applied between the rotary shaft and gear, the thrust roller bearing allows the rotary shaft and gear to rotate relative to each other. In order to enhance the mounting performance of such thrust roller bearing, conventionally, as disclosed in, for example, the Patent Document 1 and 2, there is known a structure for securing the race of the thrust roller bearing to its mating member. FIGS. 15 and 16 respectively show the examples of the conventional structure which are disclosed in the Patent Document 1 and 1 respectively.

Firstly, in FIG. 15, as the first example of the conventional structure, there is shown a structure which is disclosed in the Patent Document 1. A thrust roller bearing 71 includes a cage 72, a plurality of rollers 73, 73, and a race 74. The cage 72 is formed by bending a metal plate to have an annular shape as a whole, and has a plurality of pockets 75, 75 arranged at a plurality of locations along the circumferential direction such that they are respectively oriented in the radial direction (radially arranged). The rollers 73, 73 are slidably held within the pockets 75, 75 respectively. The race 74 can be formed by bending a metal plate. The race 74 includes an annular race portion 76 with which the rolling surfaces of the respective rollers 73, 73 can be rollingly contacted, and a cylindrical portion 77 which is curved from the outer circumferential edge of the race portion 76 toward the side where the respective rollers 73, 73 are to be disposed.

A locking portion 78, which can be formed by bending the distal edge of the cylindrical portion 77 toward the inside diameter side of the bearing 71, is engaged with the outer circumferential edge of the cage 72, whereby the cage 72 and race 74 are prevented from being separated from each other.

In the inner circumferential edge of the race 74, there is formed a support cylindrical portion 79 which is bent in the opposite direction to the cylindrical portion 77 with respect to the axial direction of the race portion 74. Further, at a plurality of locations along the circumferential direction on the outer circumferential surface of the support cylindrical portion 79, there are formed fastening protrusions 80 respectively. On the other hand, in the inner circumferential surface of the end portion of a hollow shaft 81, that is, a mating member on which the thrust roller bearing 71 is mounted, there is formed a catching groove 82 such that it extends over the entire circumference. To mount the thrust roller bearing 71 onto the hollow shaft 81, the support cylindrical portion 79 may be fitted with the inner surface of the end portion of the hollow shaft 81 and also the respective fastening protrusions 80 may be engaged with the catching groove 82. In this state, the thrust roller bearing 71 is mounted on the hollow shaft 81 such that the former is prevented from being separated from the latter unexpectedly. This can facilitate the assembling or mounting operation of a rotary mechanical apparatus such as a transmission.

Next, FIG. 16 shows the second example of the conventional structure that is disclosed in the Patent Document 2. Specifically, a thrust roller bearing 71a according to the second conventional example includes a cage 72a, a plurality of rollers 73, 73 and a pair of races 74a, 74b. Similarly to the previously described first example, prevention of separation between one race 74a (the one on the right in FIG. 16) and the cage 72a is attained by a locking portion 78 which is formed in the distal edge of a cylindrical portion 77a formed in the outer circumferential edge of the outer race 74a. On the other hand, at a plurality of locations along the circumferential direction on the inner circumferential surface of a cylindrical portion 77b formed in the inner circumferential edge of the other race 74b (the one of the left in FIG. 16), there are formed fastening protrusions 80a respectively. In the outer circumferential surface of a shaft member 83 serving as a mating member on which the thrust roller bearing 71a is to be mounted, specifically, in such portion of the shaft member 83 outer circumferential surface as exists near to a step surface 84, there is formed a catching groove 82a such that it extends over the whole periphery of such portion. To mount the thrust roller bearing 71a onto the shaft member 83, the cylindrical portion 77b may be fitted with the outer surface of the shaft member 83 and also the respective fastening protrusions 80a may be engaged with the catching groove 82a. In this state, the thrust roller bearing 71a is mounted on the shaft member 83 such that the former is prevented from being separated from the latter unexpectedly. This can facilitate the mounting operation of a rotation-type mechanical apparatus such a transmission.

Also, between the impeller or turbine of a torque converter and the stator thereof, there is interposed a thrust roller bearing used to support a thrust load which is generated by hydraulic liquid flowing between the impeller and turbine. The stator, which serves as the support surface of the thrust race of the thrust roller bearing, is generally made of aluminum in view of reducing weight and improving fuel efficiency of a vehicle. Therefore, under the actual vehicle use environment, there is the following possibility. That is, due to the relative rotation between the stator and thrust race, the support surface of the stator can be worn; and, when such wear progresses, the proper dimensional relationship between the stator and thrust race can be lost, resulting in the trouble of the vehicle.

As measures against this trouble, in a thrust roller bearing 100 which is shown in FIG. 17 and is applied to a torque converter, there are provided a plurality of rotation preventing protrusions 102 on the outer periphery of its thrust race 101, and the rotation preventing protrusions 102 are respectively fitted into their associated hydraulic fluid grooves 104 formed in a stator 103, thereby preventing relative rotation between the stator 103 and thrust race 101 (see, for example, the Patent Document 3). Here, in the inner circumferential edge of the thrust race 101, there is formed a cylindrical portion 105 and, on the edge portion of the distal end of the cylindrical portion 105, a plurality of retaining projections 107 are formed by radially outward upsetting to prevent a cage 106 from falling out.

In addition, conventionally, there are further proposed a structure in which, in a cylindrical portion formed in the inner circumferential edge of the thrust race of a thrust roller bearing, there is formed a locking projection bent outwardly in the radial direction, thereby preventing rotation between the thrust roller bearing and its mating member (see, for example, the Patent Document 4); and, a structure in which, in the cylindrical portion of a thrust roller bearing, there is provided a projection, thereby preventing the thrust roller bearing and its mating member from moving in the axial direction relative to each other (see, for example, the Patent Document 5).

PRIOR ART DOCUMENTS

Patent Documents

Patent Document 1: DE 102 27 377 A1
Patent Document 2: U.S. Pat. No. 5,647,675 A
Patent Document 3: JP 3971626 B2
Patent Document 4: JP 2007-40498 A
Patent Document 5: U.S. Pat. No. 6,945,700 B2

SUMMARY OF INVENTION

Problems that the Invention is to Solve

In the case of the first and second examples of the above-mentioned conventional structure respectively shown in FIGS. 15 and 16, it is difficult to attain the two following objects at the same time: that is, to secure the durability of the structure in a state where the portion thereof for backing up the race 74, 74b are low in rigidity; and, to reduce the manufacturing cost of the structure. The reasons for this are as follows. That is, firstly, in the case of the conventional structures respectively shown in FIGS. 15 and 16, since the respective fastening protrusions 80, 80a are respectively formed in the axially intermediate portions of the cylindrical portions 77, 77b, as metal plates for forming the races 74, 74b, it is difficult to use a metal plate the thickness dimension of which is large. That is, in the case of metal plates which are used to form the races 74, 74b, since they must support loads which are repeatedly applied to the metal plates from their associated races 74, 74b, it is necessary to use a hard plate made of iron-system metal such as carbon steel or case-hardening steel. In the case of such hard iron-system metal plate, when the thickness dimension thereof is large, it is difficult to work the above-mentioned fastening protrusions 80, 80a. This makes it necessary to reduce the thickness dimensions of the metal plates for forming the races 74, 74b to a certain degree. Therefore, for example, the material of the hollow shaft 81 and shaft member 83 can be soft, or the thickness thereof can be small. In this case, in a state where the portions of the thrust roller bearings 71, 71a for backing up the races 74, 74b are low in rigidity, it is difficult to secure the durability of the respective structures.

When the durability of metal molds used to work the respective fastening protrusions 80, 80a is not taken into consideration and, in addition, when a press forming machine having a large capacity is used, it is possible to work the fastening protrusions 80, 80a. However, the manufacturing cost thereof is increased, which is a disadvantage from the viewpoint of reduction in the costs of the thrust roller bearings 71, 71a. Further, the cylindrical portions 77, 77b, which are respectively formed such that they continuously extend over the whole peripheries of their respective races, provide a rather large obstacle to the flow of lubricating oil in the internal spaces of the thrust roller bearings where their respective rollers 73, 73 are provided. Thus, from the viewpoint of lubrication performance, it is difficult to secure the durability of the thrust roller bearings 71, 71a respectively including their associated races 74, 74b.

Also, in the thrust roller bearing shown in FIG. 17 and disclosed in the Patent Document 3, since the plurality of rotation preventing protrusions 102 are provided on the outer periphery of the thrust race 101, the thrust race 101 is increased in size, which increases the material cost thereof.

Further, in the structure disclosed in the Patent Document 4, due to provision of the locking projection, after the cylindrical portion is bent by press forming, there is necessary an operation in which the cylindrical portion is cut in part and the thus cut portion is then curved. According to the projection disclosed in the Patent Document 5, after the cylindrical portion is bent by press forming, the projection must be provided by press forming the cylindrical portion. In both cases, the number of steps for manufacturing the thrust roller bearing is increased. In addition, in the case of the projection disclosed in the Patent Document 5, since it is held by point contact in a groove or a hole formed in the mating member, there is a fear that the rigidity of the holding portion cannot be secured sufficiently.

The present invention aims at solving the problems found in the above-mentioned conventional thrust roller bearings. Thus, it is an object of the invention to provide a thrust roller bearing which can realize both the maintenance of the durability of such portion of the thrust roller bearing as backs up its race in a state where such portion is low in rigidity and the reduction of the manufacturing cost of the thrust roller bearing. Another object of the invention is to provide a thrust roller bearing and a method for manufacturing a thrust race thereof, according to which, in the thrust race thereof, there can be provided a protrusion securable to a mating member on which the thrust race is to be mounted, with the rigidity of the protrusion enhanced, without increasing the number of manufacturing operations.

Means for Solving the Problems (1) A thrust roller bearing including:
an annular cage having a plurality of pockets arranged at a plurality of locations along a circumferential direction such that each of the pockets is oriented in a radial direction;
a plurality of rollers held inside the respective pockets in a rollable manner; and
at least one thrust race having an annular race portion on which a rolling surface of each of the rollers contacts in a rolling manner, and a cylindrical portion extending in an axial direction from a circumferential edge of the race portion toward a side on which the rollers are arranged,
wherein, at a plurality of locations along the circumferential direction on the cylindrical portion, cutout portions are formed such that each of the cutout portions is recessed in the axial direction from a distal edge of the cylindrical portion toward the race portion, and a protrusion is provided at a portion closer to the race portion from a bottom edge of each of the cutout portions such that the protrusion protrudes in the radial direction from the cylindrical portion toward a side away from the race portion, and wherein the protrusion is configured to serve as a race-retaining locking portion to prevent the thrust race from moving out from a mating member on which the thrust race is mounted.

(2) The thrust roller bearing as set forth in (1), wherein each of the cutout portions is formed to extend over an entire axial length of the cylindrical portion, and a portion of the circumferential edge of the race portion that corresponds to the cutout portion protrudes in the radial direction from the cylindrical portion such that the protruded portion forms the race-retaining locking portion.

(3) The thrust roller bearing as set forth in (1), wherein each of the cutout portions is formed in a portion of the cylindrical portion other than a base end portion of the cylindrical portion that lies closer to the race portion, and an intermediate portion of the remaining uncut base end portion in the circumferential direction is bulged in the radial direction away from the race portion such that the bulged portion forms the race-retaining locking portion.

(4) The thrust roller bearing as set forth in (3), wherein a bulging amount of the bugled portion is adjusted in accordance with a size of each of the cutout portions.

(5) The thrust roller bearing as set forth in any one of (1) to (4), wherein, at a plurality of locations along the circumferential direction on the distal edge of the cylindrical portion, portions shifted in the circumferential direction from the cutout portions respectively are bent in the radial direction toward the side on which the rollers are arranged to form a cage-retaining locking portion to prevent the thrust race and the cage from being separated.

(6) A thrust roller bearing including:

an annular cage having a plurality of pockets arranged at a plurality of locations along a circumferential direction such that each of the pockets is oriented in a radial direction;

a plurality of rollers held inside the respective pockets in a reliable manner; and at least one thrust race having an annular race portion on which a rolling surface of each of the rollers contacts in a rolling manner, and a cylindrical portion extending in an axial direction from a circumferential edge of the race portion toward a side on which the rollers are arranged, wherein protrusions are formed at a plurality of locations along the circumferential direction on the cylindrical portion of the thrust race such that each of the protrusions protrudes in the radial direction toward a side away from the race portion and has a width in the circumferential direction.

(7) The thrust roller bearing as set forth in (6), wherein a distal end of each of the protrusions is formed closer to the race portion than from a distal edge of the cylindrical portion in the axial direction.

(8) The thrust roller bearing as set forth in (6) or (7), wherein the protrusions are configured to line contact, in the circumferential direction, a mating member on which the thrust race is mounted to prevent the thrust race from rotating with respect to the mating member.

(9) The thrust roller bearing as set forth in (6) or (7), wherein the protrusions are configured to position the thrust race with respect to a mating member on which the thrust race is mounted.

(10) A method for manufacturing a thrust race of a thrust roller bearing, the thrust bearing including an annular cage having a plurality of pockets arranged at a plurality of locations along a circumferential direction such that each of the pockets is oriented in a radial direction, a plurality of rollers held inside the respective pockets in a rollable manner, and at least one thrust race having an annular race portion on which a rolling surface of each of the rollers contacts in a rolling manner, and a cylindrical portion extending in an axial direction from a circumferential edge of the race portion toward a side on which the rollers are arranged, the method including bending an annular metal plate by press forming, the bending including forming the cylindrical portion on the circumferential edge of the race portion, and simultaneously, forming protrusions, at a plurality of locations along the circumferential direction, on the cylindrical portion such that each of the protrusions protrudes in the radial direction toward a side away from the race portion and has a width in the circumferential direction.

(11) The method as set forth in (10) for manufacturing the thrust race of the thrust roller bearing, wherein portions of the annular metal plate where the protrusions are to be formed are obtained by cutting out a circumferential surface of the annular metal plate that forms the distal edge of the cylindrical portion, and a protruding amount of the protrusions is adjustable in accordance with to a size of the cutout portions.

Effects of the Invention

According to the thrust roller bearing of the invention, the plurality of race-retaining locking portions for preventing the thrust race and the mating member from separating are provided as the protrusions obtained by causing, not the axially intermediate portions of the cylindrical portion, but the portions closer to the race portion from the bottom edges of the respective cutout portions, to protrude in the radial direction. Therefore, even when the thickness dimension of a metal plate for forming the race is large to a certain degree, the race-retaining locking portions can be formed without so much cost. This makes it possible to realize a thrust roller bearing which can ensure its durability even when the rigidity of a portion backing up the thrust race is low, and also can reduce manufacturing cost.

Further, by providing sufficient durability of metal molds for press forming the race, the thickness of a hard metal plate for forming the race can be ensured while suppressing manufacturing cost. Further, when portions of the cylindrical portion are used to form the respective race-retaining locking portions, axially recessed cutout portions are provided. Therefore, a sufficient amount of lubricating oil can be supplied through these cutout portions to an internal space where the rollers are arranged.

According to the thrust roller bearing of the invention, the cylindrical portion of the thrust race is formed with protrusions which protrude in the radial direction away from the race portion and each having a certain width in the circumferential direction. Therefore, the protrusions having improved rigidity can be formed without increasing the number of manufacturing operations, and the thrust race is configured in a compact manner.

According to the thrust roller bearing thrust race manufacturing method of the invention, by bending an annular metal plate by press forming, the cylindrical portion is formed in the circumferential edge of the race portion, and simultaneously, protrusions are formed on the cylindrical portion to protrude in the radial direction away from the race portion and with a certain width in the circumferential direction. Therefore, the protrusions having improved rigidity can be formed without increasing manufacturing cost, and the thrust race is configured in a compact manner.

BRIEF DESCRIPTION OF THE DRAWINGS

FIG. 2A is a front view of a thrust race of FIG. 1, FIG. 2B is a sectional view thereof taken along the line II-II of FIG. 2A, and FIG. 2C is a perspective view thereof;

FIG. 6A is a front view of a thrust race of FIG. 5, and FIG. 6B is a sectional view taken along the VI-VI line of FIG. 6A;

FIG. 9A is a perspective view of a portion of a race of FIG. 8, and FIG. 9B is an orthographic projection thereof relating to a modification of the third embodiment of the invention;

FIG. 10A is a perspective view of a portion of a race of a thrust roller bearing according to a fourth embodiment of the invention which is a modification of the third embodiment, and FIG. 10B is an orthographic projection thereof;

FIG. 13A is a perspective view of a portion of a race incorporated in a thrust roller bearing according to a sixth embodiment of the invention, FIG. 13B is an orthographic projection thereof, and FIG. 13C is a sectional view taken along the line XIII-XIII of FIG. 13B;

EMBODIMENTS OF THE INVENTION

Hereinafter, embodiments of a thrust roller bearing and a method for manufacturing a thrust race thereof according to the present invention will be described in detail with reference to the drawings.

First Embodiment

Figure 1:
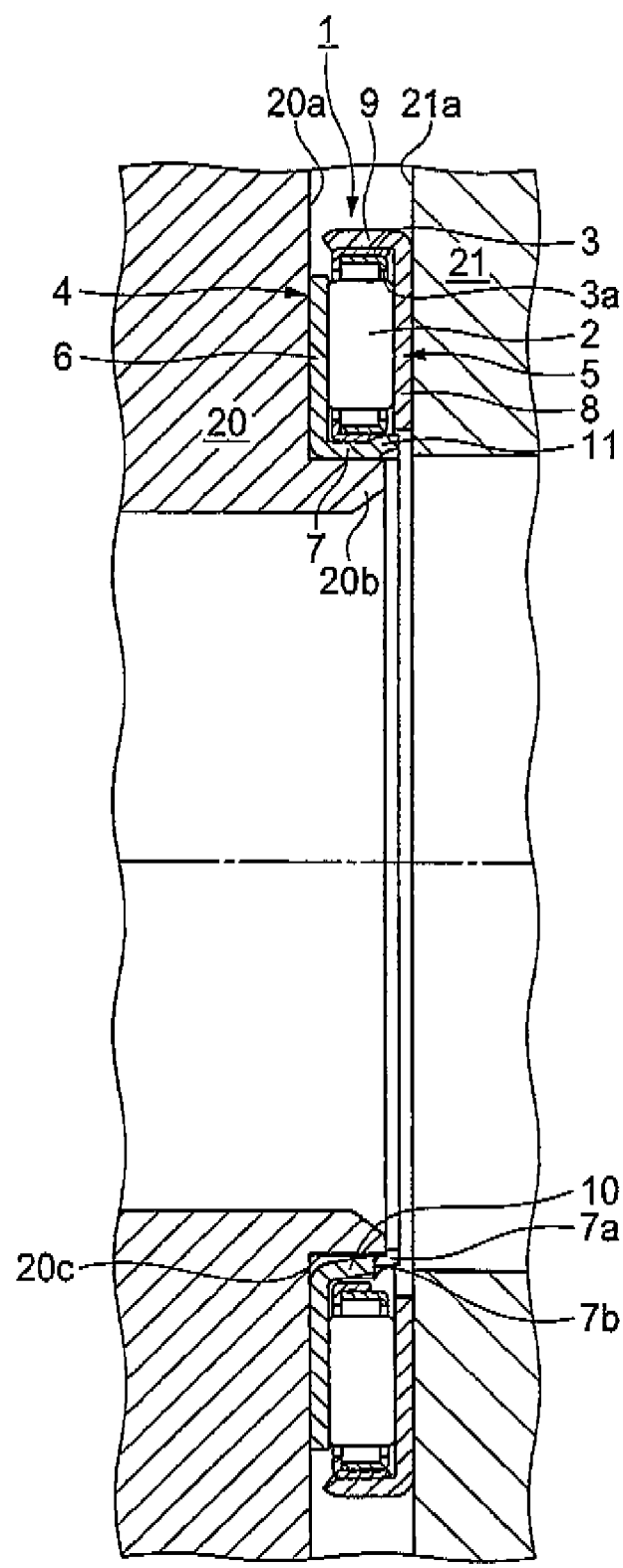
FIG. 1 is a sectional view of a thrust roller bearing according to a first embodiment of the invention.

FIG. 1 shows a thrust roller bearing according to a first embodiment of the invention. According to the present embodiment, a thrust roller bearing 1 includes radially arranged rollers 2, a cage 3 which is formed to have an annular shape as a whole and also is used to rollably hold the plurality of rollers 2, and first and second thrust races 4 and 5 respectively for holding the plurality of rollers 2 from both sides in the axial direction of the rollers 2.

The cage 3 includes two metal plates, each of which is formed to have an annular shape as a whole and also have a U-shaped section, and the two metal plates are combined together such that their respective outside and inside ring-shaped portions are superimposed on top of each other. The cage 3 includes the same number of pockets 3a as the rollers 2 which are formed at the plurality of locations along the circumferential direction on the cage 3. Each pocket 3a faces in the radial direction of the cage 3, while the pockets 3a are respectively arranged in the radial direction of the thrust roller bearing 1. The plurality of rollers 2 are to be rollably held within their associated pockets 3a.

The first thrust race 4 includes an annular race portion 6 with which the rolling surfaces of the plurality of rollers 2 can be rollingly contacted, and an inside cylindrical portion 7 which is formed in the inner circumferential edge of the race portion 6 in the axial direction thereof to extend over the whole periphery thereof and also which exists on the side where the respective rollers 2 are disposed. Also, the second thrust race 5 includes an annular race portion 8 with which the rolling surfaces of the plurality of rollers 2 can be rollingly contacted, and an outside cylindrical portion 9 which is formed in the outer circumferential edge of the race portion 8 in the axial direction thereof to extend over the whole periphery thereof and also which exists on the side where the respective rollers 2 are disposed. The first and second thrust races 4 and 5 are respectively supported on first and second members 20 and 21 which are respectively used as their mating members. In the case of the first thrust race 4, the back surface of the race portion 6 is contacted with the opposing surface 20a of the first member 20 and the inside cylindrical portion 7 is fitted with the annular shaft portion 20b of the first member 20. In the second thrust race 5, the back surface of the race portion 8 is contacted with the opposing surface 21a of the second member 21.

As shown in FIG. 2, on the inside cylindrical portion 7 of the first thrust race 4, there are provided a plurality of (in the present embodiment, four) protrusions 10 which respectively project in the opposite direction to the race portion 6 in the radial direction of the inside cylindrical portion 7, that is, inwardly in the radial direction thereof, and also each of which has a given width in the circumferential direction of the inside cylindrical portion 7. The protrusions 10 can be respectively fitted into their associated groove portions 20c respectively formed in the annular shaft portion 20b of the first member 20, whereby they can be respectively line contacted with the groove portions 20c in the circumferential direction thereof to prevent the first thrust race 4 from rotating with respect to the first member 20. The distal ends of the protrusions 10 are so formed as to exit closer to the race portion 6 in the axial direction of the thrust roller bearing than the distal edge 7a of the inside cylindrical portion 7. That is, at the plurality of locations in the circumferential direction on the inside cylindrical portion 7, other than the base end portions of the inside cylindrical portion 7 existing near to the race portion 6, there are formed cutout portions 7b which are respectively recessed, in the axial direction of the cylindrical portion 7, closer to the race portion 6 than the distal edges 7a of the inside cylindrical portion 7. The respective protrusions 10 are respectively formed using the uncut base end portions of the inside cylindrical portion 7 which exist at the same positions as the cutout portions 7b in the circumferential direction of the inside cylindrical portion 7. Further, in the distal edge portion 7a of the inside cylindrical portion 7 of the first thrust race 4, specifically, at positions different from the protrusions 10 in the circumferential direction of the inside cylindrical portion 7, there are formed a plurality of (in the present embodiment, four) locking projections 11 which are respectively projected by calking outwardly in the radial direction of the inside cylindrical portion 7. The locking projections 11 abut the inside diameter side lateral surface of the cage 3 to confine the cage 3.

Figure 3A:
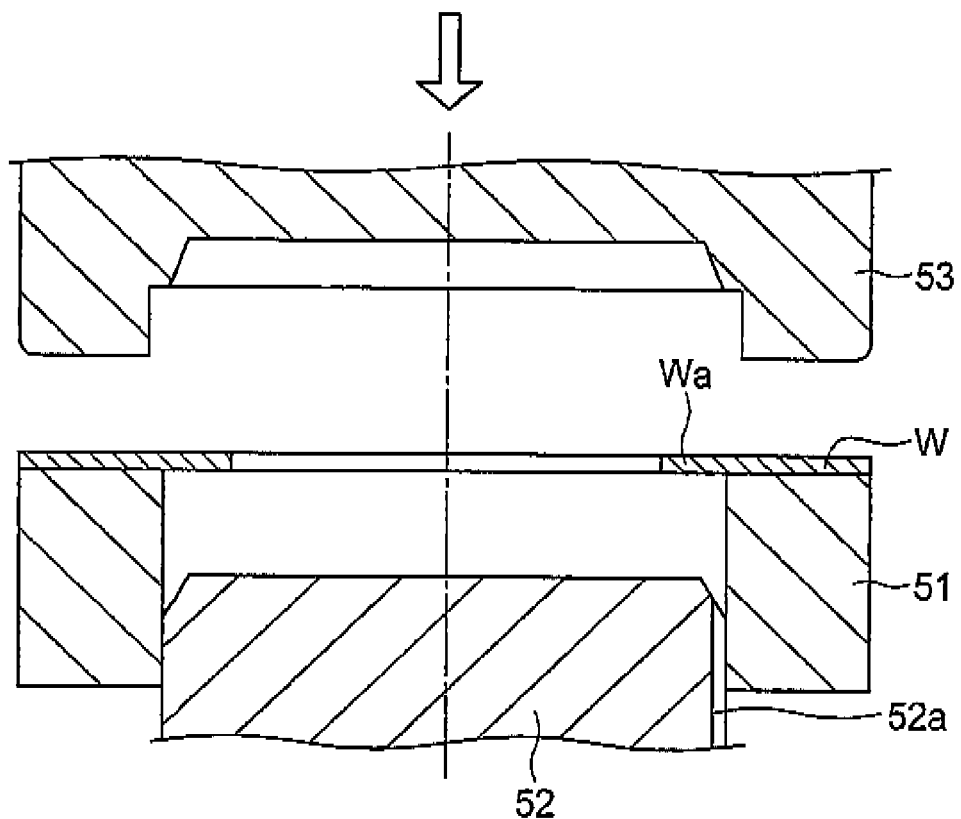
FIG. 3A is a sectional view illustrating how a cylindrical portion and a protrusion of the thrust race are formed by pressing, using a fixed punch taken along the line III-III of FIG. 3B.
Figure 3B:
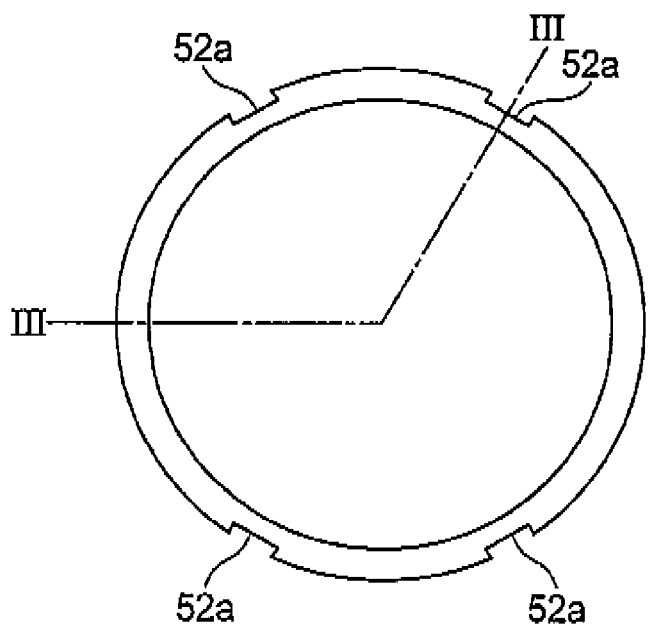
FIG. 3B is a top plan view of the fixed punch.
Figure 4:
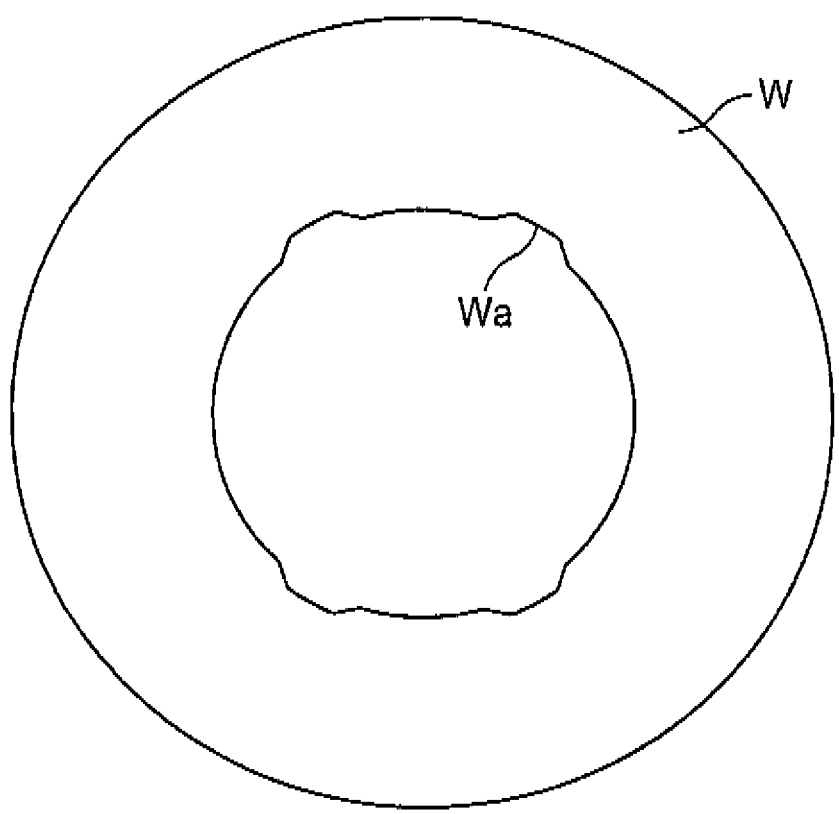
FIG. 4 is a front view of a thrust race blank before being pressed.

To produce the first thrust race 4, an annular flat metal plate W, which is a thrust race blank as shown in FIG. 4, can be press formed using such a working machine as shown in FIG. 3. The annular metal plate W, before press formed, includes a cutout Wa which is exists in the portion for forming the protrusion 10 and is formed by cutting it out outwardly in the radial direction of the metal plate W from the circumferential surface of the metal plate W. The working machine includes an annular movable support member 51 for supporting the metal plate W, a cylindrical fixed punch 52 to be inscribed in the movable support member 51 and a movable die 53 to be disposed upwardly of the movable support member 51 and fixed punch 52. In operation, the metal plate W is put on the movable support member 51. In this state, when the movable die 53 is pressed down from above, the movable support member 51 is also pressed downwardly with respect to the fixed punch 52, whereby, between the outer circumferential surface of the fixed punch 52 and the inner circumferential surface of the movable die 53, the inside cylindrical portion 7 is bent worked substantially at right angles with respect to the race portion 6.

Here, in the fixed punch 52, specifically, in the local portions of the outer circumferential surface thereof, as shown in FIG. 3B, there are formed escape portions 52a. Therefore, when the metal plate W is press formed such that the escape portions 52a of the fixed punch 52 and the cutouts Wa of the metal plate W are in phase, such portions of the metal plate W as are stored between the escape portions 52a of the fixed punch 52 and the inner circumferential surface of the movable die 53 are not bent at right angles but are projected inwardly in the radial direction of the inside cylindrical portion 7 to thereby form the protrusions 10. Here, the circumferential direction width of each escape portion 52a can be set according to the given circumferential direction width of each protrusion 10.

In the case that the protrusions are provided 10 by forming the cutouts Wa in this manner, the bending amounts of such portions of the metal plate W as are stored between the escape portions 52a of the fixed punch 52 and the inner circumferential surface of the movable die 53 when they are pulled and bent by the inside cylindrical portion 7 bent substantially at right angles are small; and, the projecting amounts of the protrusions 10 when they are projected inwardly from the inside cylindrical portion 7 are large. On the other hand, in the case that the protrusions 10 are provided without forming the cutout portions, such portions of the metal plate W as are stored between the escape portions 52a of the fixed punch 52 and the inner circumferential surface of the movable die 53 are pulled and bent greatly by the inside cylindrical portion 7, whereas the projecting amounts of the protrusions 10 when they are projected inwardly from the inside cylindrical portion 7 are small. Therefore, the projecting amounts of the protrusions 10 can be adjusted by adjusting the size of the cutouts Wa.

Therefore, according to the method for manufacturing the thrust race 4 of the thrust roller bearing 1 according to the present embodiment, by bending the annular metal plate W by press forming, simultaneously when the inside cylindrical portion 7 is formed in the inner circumferential edge of the race portion 6, in the inside cylindrical portion 7, there can be provided the protrusions 10 which are respectively projected inwardly in the radial direction of the inside cylindrical portion 7 and also respectively have a given width in the circumferential direction. That is, without increasing the number of manufacturing operations, there can be formed the protrusions 10 which are enhanced in rigidity, and there can be produced the thrust race 4 that has a compact structure.

Also, according to the thrust roller bearing 1 of the present embodiment, in the inside cylindrical portion 7 of the thrust race 4, there are formed the protrusions 10 which are respectively projected inwardly in the radial direction of the inside cylindrical portion and also respectively have a given width in the circumferential direction. The protrusions 10 can be line contacted with the first member 20 supporting the thrust race 4 in the circumferential direction thereof, thereby being able to prevent the thrust race 4 from rotating with respect to the first member 20. Accordingly, there can be formed the protrusions 10 which are enhanced in rigidity and can cooperate together to provide a rotation preventive function, and there can be produced the thrust race 4 that has a compact structure.

Second Embodiment

Figure 5:
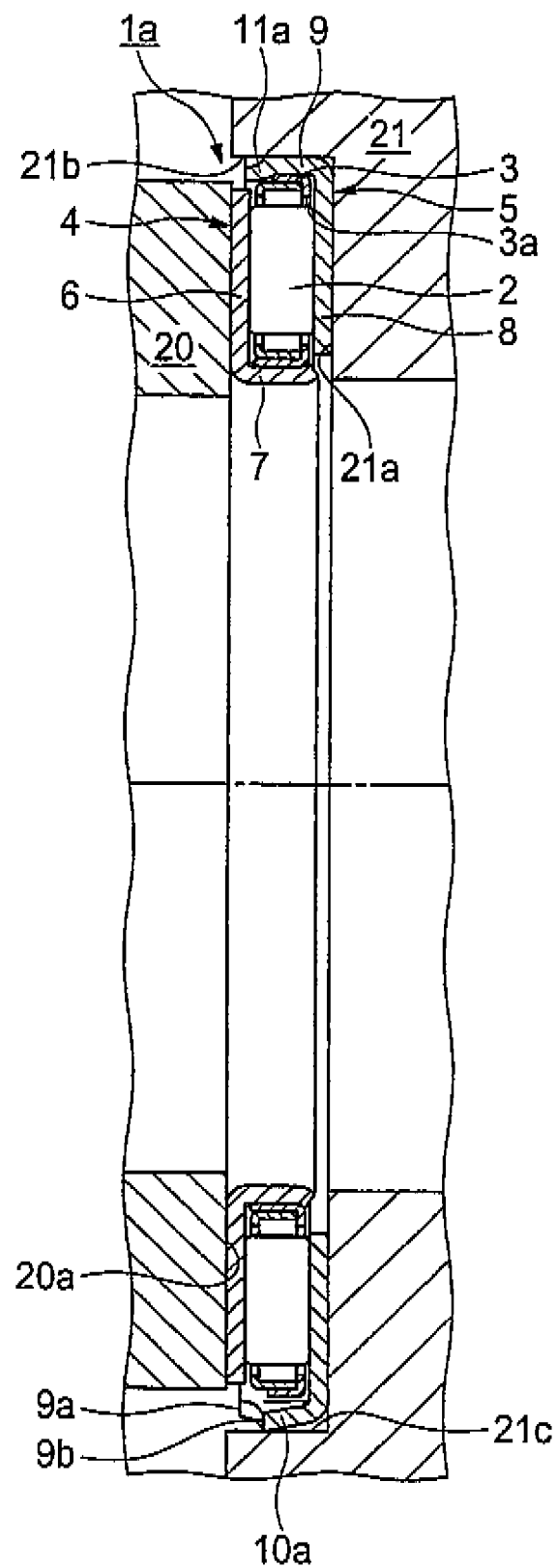
FIG. 5 is a sectional view of a thrust roller bearing according to a second embodiment of the invention.

FIG. 5 shows a thrust roller bearing according to a second embodiment of the invention. Here, the same or equivalent parts of the present embodiment to the first embodiment are given the same designations and thus the description thereof is saved or simplified.

According to a thrust roller bearing 1a of the present embodiment, a first thrust race 4 is configured such that the back surface of its race portion 6 contacts the opposing surface 20a of a first member 20, and the second thrust race 5 is configured such that the back surface of its race portion 8 contacts the opposing surface 21a of a second member 21 and such that its outside cylindrical portion 9 is fitted in the annular recessed portion 21b of the second member 21.

As shown in FIGS. 6A and 6B, according to the present embodiment, in the outside cylindrical portion 9 of the second thrust race 5, there are provided a plurality of (in the present embodiment, four) protrusions 10a each having a given width in the circumferential direction of the outside cylindrical portion 9 such that, in the radial direction of the outside cylindrical portion 9, they respectively project in the opposite direction to the race portion 6, that is, outwardly in the radial direction of the outside cylindrical portion 9. The protrusions 10a are respectively fitted into groove portions 21c respectively formed in the annular recessed portions 21b of the second member 21 in a line contact manner in the circumferential direction of the outside cylindrical portion 9, thereby being able to prevent the second thrust race 5 from rotating with respect to the second member 21. The distal end of each protrusion 10a is formed to exist in the axial direction of the outside cylindrical portion 9 closer to the race portion than the distal edge 9a of the outside cylindrical portion 9. That is, at the plurality of locations along circumferential direction on the outside cylindrical portion 9 in the other portions of the outside cylindrical portion 9 than the base end portion thereof that is situated near to the race portion 6, with respect to the axial direction of the outside cylindrical portion 9, there formed cutout portions 9b which are respectively recessed further toward the race portion 6 than the distal edges 9a of the outside cylindrical portion 9. The protrusions 10a are respectively formed using the uncut base end portion of the outside cylindrical portion 9 that exists at the same position as the cutout portions 9b in the circumferential direction of the outside cylindrical portion and remains uncut. Further, in the present embodiment as well, in the distal edges 9a of the outside cylindrical portion 9 of the second thrust race 5, at the positions thereof different from the protrusions 10a in the circumferential direction thereof, there are formed a plurality of (in the present embodiment, four) locking projections 11a which are respectively caulked inwardly in the radial direction of the outside cylindrical portion 9, while the locking projections 11a are formed to prevent the cage 3 from moving out.

Figure 7A:
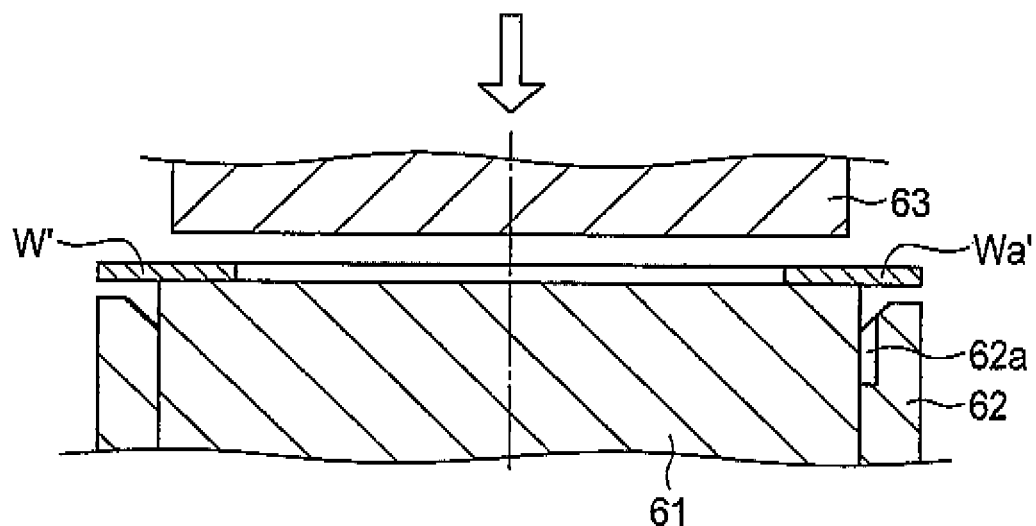
FIG. 7A is a sectional view illustrating how a cylindrical portion and a protrusion of the thrust race are formed by pressing, using a movable die taken along the line VII-VII of FIG. 7B.
Figure 7B:
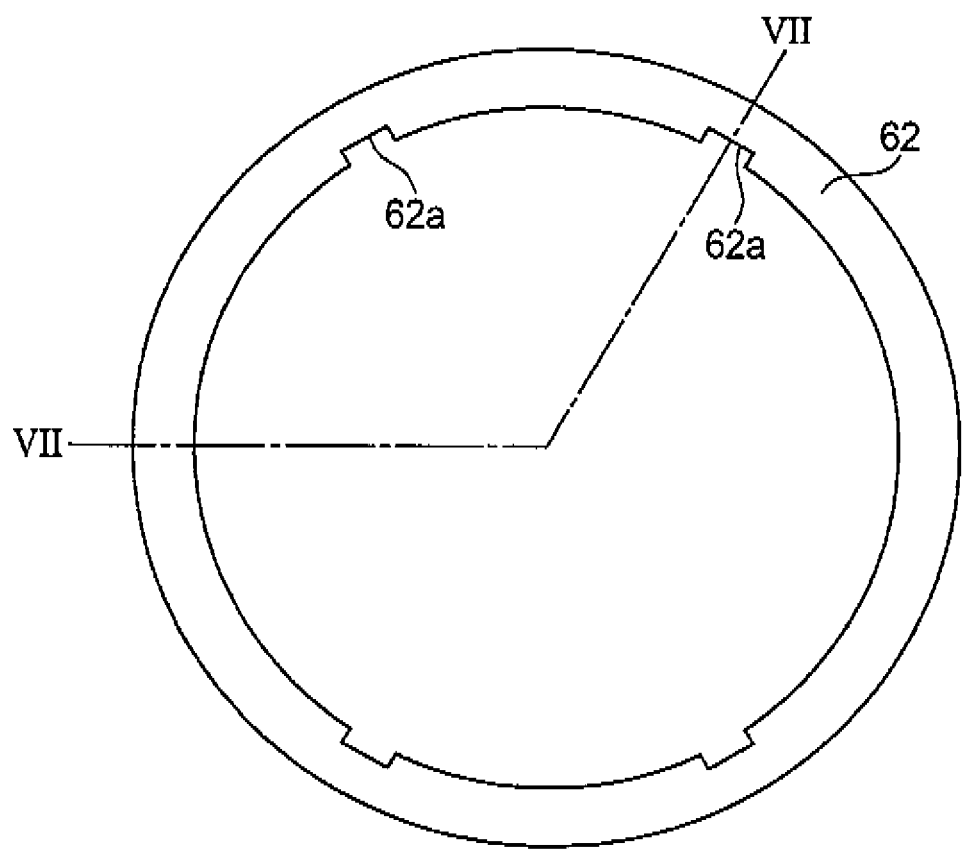
FIG. 7B is a bottom view of the movable die.

According to the second thrust race 5 as well, in the case that an annular metal plate W' is press formed using a working machine as shown in FIG. 7A including a movable support member 61, a fixed die 62 and a movable punch 63, there can be formed the outside cylindrical portion 9 that is bent worked substantially at right angles in the outer circumferential edge of the race portion 8. In this case as well, in the fixed die 62, as shown in FIG. 7B, there is formed an escape portion 62a locally in the circumferential surface thereof. Due to this, the portion of the metal plate W', which is stored between the escape portion 62a of the fixed die 62 and the outer circumferential surface of the movable punch 63, is not bent at right angles but is projected outwardly in the radial direction, thereby forming the protrusion 10a.

Here, in the present embodiment as well, the projecting amount of each protrusion 10a can be adjusted by adjusting the size of a cutout portion Wa' obtained by cutting out the outer circumferential surface of the metal plate W' inwardly in the radial direction.

Therefore, in a method for manufacturing the thrust race 5 of the thrust roller bearing 1a according to the present embodiment as well, by bending the annular metal plate W' by press forming, simultaneously when the outside cylindrical portion 9 is formed in the outer circumferential edge of the race 8, in the outside cylindrical portion 9, there can be formed the protrusions 10a which respectively project outwardly in the radial direction of the outside cylindrical portion 9 and respectively have a given width in the circumferential direction. Therefore, without increasing the number of manufacturing operations, there can be formed the protrusions 10a the rigidity of which is enhanced, and the structure of the thrust race 5 can be made compact.

Also, according to the thrust roller bearing 1a of the present embodiment, in the outside cylindrical portion 9 of the thrust race 5, there are formed the protrusions 10a respectively projecting outwardly in the radial direction and having a given width in the circumferential direction. The protrusions 10a can be line contacted in the circumferential direction of the thrust race 5 with the second member 21 which is supporting the thrust race 5, thereby providing a rotation preventive function to prevent the thrust race 5 from rotating with respect to the second member 21. Therefore, there can be formed such protrusions 10a as are enhanced in rigidity and have the rotation preventive function, and the structure of the thrust race 5 can be made compact.

Third Embodiment

Figure 8:
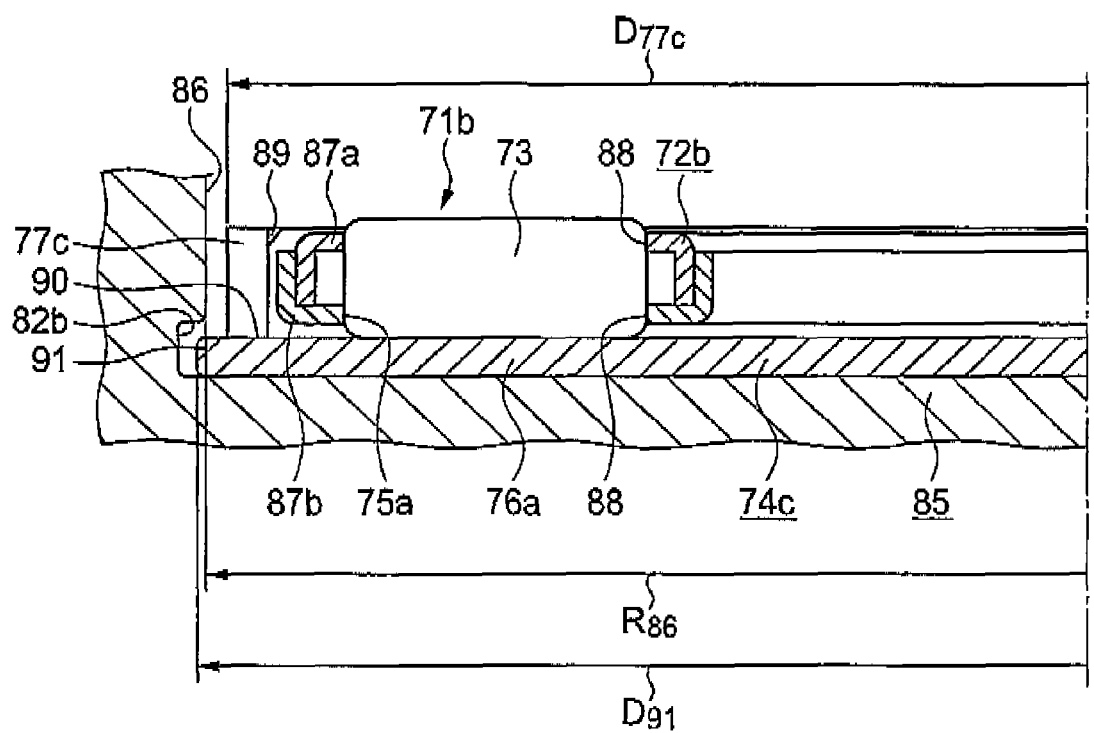
FIG. 8 is a sectional view of a half of a thrust roller bearing according to a third embodiment of the invention.

FIGS. 8 to 9B respectively show a thrust roller bearing 71b according to a third embodiment of the invention. According to the present embodiment, the invention is applied to a structure, in which the thrust roller bearing 71b is mounted into a retaining recess 86 formed in its mating member, that is, a housing 85 and the thrust roller bearing 71b is prevented from moving out from the retaining recess 86 unexpectedly. The thrust roller bearing 71b includes a cage 72b, a plurality of rollers 73 and a race 74c.

The cage 72b is ring-shaped and includes a plurality of pockets 75a which are formed at a plurality of locations along the circumferential direction so as to be oriented in the radial direction. According to the present embodiment, to produce the cage 72b, a pair of cage elements 87a, 87b, which have been respectively produced by bent working their associated metal plates to thereby have a U-shaped section, may be combined together in such a manner their respective outside and inside ring-shaped portions are superimposed on top of each, thereby forming a hollow ring-shaped product. The respective pockets 75a are structured by combining together rectangular-shaped through holes 88 and 88 which have been respectively formed in the mutually corresponding portions of the two cage elements 87a, 87b. With respect to the circumferential direction of the two cage elements 87a, 87b, the width of each through hole 88 is set slightly smaller than the outside diameter of each roller 73. The two cage elements 87a, 87b are connected to each other such that the respective rollers 73 are interposed between the through holes 88, 88 to thereby prevent the two cage elements 87a, 87b against separation from each other, thereby completing the cage 72b. In a state where the two cage elements 87a, 87b are combined together as the cage 72b, the respective rollers 73 are held such that they are free to roll within their associated pockets 75a and also they are prevented from moving out from the respective pockets 75a.

Also, the race 74c can be obtained by bending a metal plate made of hard metal such as carbon steel or hardened steel, while it includes a race portion 76a and a cylindrical portion 77c. The race portion 76a of the race 74c is a portion with which the rolling surface of each roller 73 can be rollingly contacted, and also which has an annular shape. Also the cylindrical portion 77c is formed in the outer circumferential edge of the race portion 76a by bending a metal plate such that, with respect to the axial direction of the race 74c, the metal plate is directed on the side where the respective rollers 73 are displaced and is bent in the upward direction in FIGS. 8 and 9.

The cage 72b is disposed on the inside diameter side of the cylindrical portion 77c such that the cage 72b and the race 74c can be rotated relative to each other. For this purpose, the inside diameter of the cylindrical portion 77c is set slightly larger than the outside diameter of the cage 72b. At the plurality of locations along the circumferential direction on the distal end portion of the cylindrical portion 77c, there are formed cage-retaining locking portions 89 which are respectively bent inwardly in the radial direction of the cylindrical portion 77c. The diameters of the inscribed circles of these cage-retaining locking portions 89 are set slightly smaller than the outside diameter of the cage 72b. Due to this, the cage 72b and the race 74c are combined together such that they can be rotated relative to each other and they can be prevented from separating from each other.

Further, at the plurality locations along the circumferential direction (preferably, at three or more equally-spaced locations along the circumferential direction) on the cylindrical portion 77c, there are respectively formed cutout portions 90 which are recessed further toward the race portion 76a than the distal edge of the cylindrical portion 77c (in FIGS. 8 and 9, the upper end edge of the cylindrical portion 77c) and also which respectively extend over the whole axial length of the cylindrical portion 77c. Therefore, the cylindrical portion 77c is discontinuous over the whole width thereof in the respective cutout portions 90. On the other hand, the diameters of such portions (the circumscribed circles) of the outer circumferential edge of the race portion 76a as correspond to the respective cutout portions 90 are set larger than the diameters of the other portions (the portions where the cylindrical portion 77c is formed), whereby such portions are projected outwardly in the radial direction of the cylindrical portion 77c further than the cylindrical portion 77c. The projected portions are used as race-retaining locking portions 91. In the present embodiment, these race-retaining locking portions 91 are respectively formed to have a projecting arc shape. The diameter $D_{91}$ of the circumscribed circle of each race-retaining locking portion 91, in a free state where no external force is applied to the race 74c, is set slightly larger than the outside diameter $D_{77c}$ of the cylindrical portion 77c and is also set slightly larger than the inside diameter $R_{86}$ of the near-to-opening portion of the retaining recess 86 which will be discussed below ($D_{91}$>$R_{86}$>$D_{77c}$).

In order to assemble or mount the thrust roller bearing 71b having above-structure into the housing 85, in the inner circumferential surface of the deep end portion of the retaining recess 86 formed in the housing 85, there is formed a catching groove 82b over the whole periphery thereof. To mount the thrust roller bearing 71b into the housing 85, while elastically reducing the diameters of the circumscribed circles of the respective race-retaining locking portions 91, the race-retaining locking portions 91 may be pushed into the retaining recess 86 and, at the same time, the cylindrical portion 77c may be fitted into the retaining recess 86. In a state in which the cylindrical portion is fitted into the retaining recess 86 until one surface of the race portion 76a of the race 74c is contacted with the deep end face of the retaining recess 86, the distal end portions of the race-retaining locking portions 91 may be engaged into the catching groove 82b. In this state, the thrust roller bearing 71b is assembled to the housing 85 such that it is prevented against separation from the housing 85. This can facilitate the assembling operation of a rotation-type mechanical apparatus such as a transmission. According to the present embodiment, since each race-retaining locking portion 91 has a projecting arc shape the width of which decreases as it approaches the distal end thereof, the respective race-retaining locking portions 91 are easy to deform elastically, whereby the engaging operation to engage them with the catching groove 82b can be carried out with a relatively light force.

According to the above structure of the present embodiment, there can be realized the thrust roller bearing 71b which can secure the durability thereof in a state where the back-up portion for backing up the race 74c is low in rigidity and also can reduce the manufacturing cost thereof. Specifically, according to the thrust roller bearing 71b, the plurality of race-retaining locking portions 91 for prevention of separation between the race 74c and housing 85 are formed not in the axial direction intermediate portion of the cylindrical portion 77c but in such portion of the outer circumferential edge of the race portion 76a as exists in the discontinuous portion of the cylindrical portion 77c such that a portion of the race portion 76a is extended outwardly in the diameter portion of the race portion 76a. Therefore, even in the case that the thickness dimension of the metal plate for forming the race 74c is set large to a certain degree, the operation to work the race-retaining locking portions 91 can be carried out without increasing the cost thereof so much. That is, a metal plate as a blank is punched, for example by pressing, to form a flat-plate-shaped intermediate work including portions for forming the race portion 76a, race-retaining locking portions 91 and cylindrical portion 77c. Thereafter, the portion of the intermediate work for forming the cylindrical portion 77c is bent with respect to the portion of the intermediate member for forming the race portion 76a. In this case, there can be formed the race portion 76a, race-retaining locking portions 91 and cylindrical portion 77c simultaneously. These operations, even when the thickness dimension of the metal plate is large to a certain degree, can be carried out easily while securing the durability of working facilities such as metal molds. Therefore, the thickness of the hard metal plate of the race 74c can be ensured while suppressing manufacturing cost.

Further, since the portions of the cylindrical portion 77c where the respective race-retaining locking portions 91 are formed at the plurality of locations along circumferential direction are respectively formed as the cutout portions 90 which are recessed in the axial direction of the cylindrical portion 77c, a sufficient amount of lubricating oil can be supplied through these cutout portions 90 to the internal space where the respective rollers 73 are provided. Therefore, even under a severe use condition, for example, even under a condition where the rotation speed is high and a thrust load to be applied is large, it is possible to prevent the rolling contact portion and sliding contact portion of the thrust roller bearing against damage such as abnormal abrasion and seizure.

Owing to the above effects, according to a thrust roller bearing of the invention, the durability thereof can be ensured and the manufacturing cost thereof can be reduced at the same time even when the rigidity of the portion for backing up the race 74c is low because the composing material of the housing 85 is soft or because the thickness of the housing 85 is small, or even when the back-up portion is discontinuous in part in the circumferential direction or in the radial direction (that is, the back-up surface is uneven) due to the existence of the recessed groove in the back-up portion.

Fourth Embodiment

FIGS. 10A and 10B, a modification of FIG. 8, show a thrust roller bearing according to a fourth embodiment of the invention. In the present embodiment, each of race-retaining locking portions 91a, which are respectively formed at the plurality of locations along circumferential direction on a race portion 76a of a race 74d, is formed to have a substantially trapezoid which can be obtained by rounding an angle.

According to the structure of the present embodiment, there is increased a force which is necessary to engage the race-retaining locking portions 91 with the catching groove 82b (see FIG. 8), but after engagement, the race-retaining locking portions 91 and the catching groove 82b can be made harder to be disengaged from each other. Further, since the widths of the distal edges of the respective race-retaining locking portions 91a are large, even in the case that, while the race 74d is being delivered, the distal edges of the respective race-retaining locking portions 91a happen to collide with any one of other composing members, the surface of the composing member can be made harder to be damaged.

The structures and operations of the other remaining portions of the present embodiment are similar to those of the previously described third embodiment, and thus the duplicate illustration and description thereof are omitted here.

Fifth Embodiment

Figure 11:
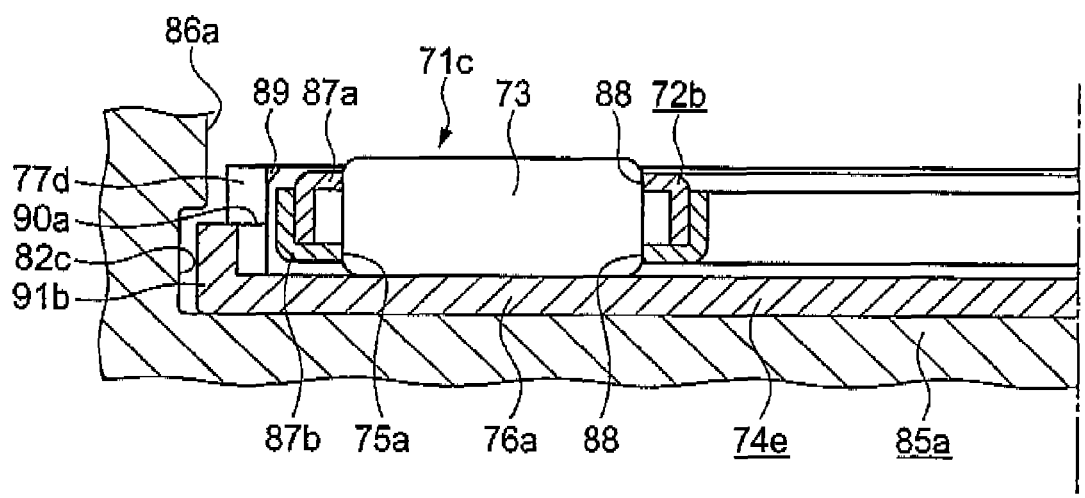
FIG. 11 is a sectional view of a half of a thrust roller bearing according to a fifth embodiment of the invention.
Figure 12A:
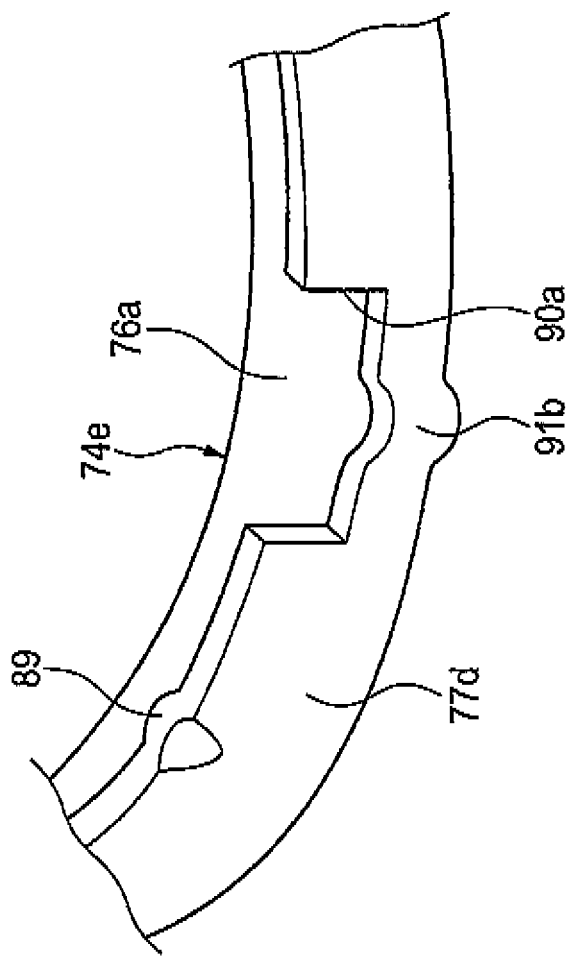
FIG. 12A is a perspective view of a portion of a race of FIG. 11.
Figure 12B:
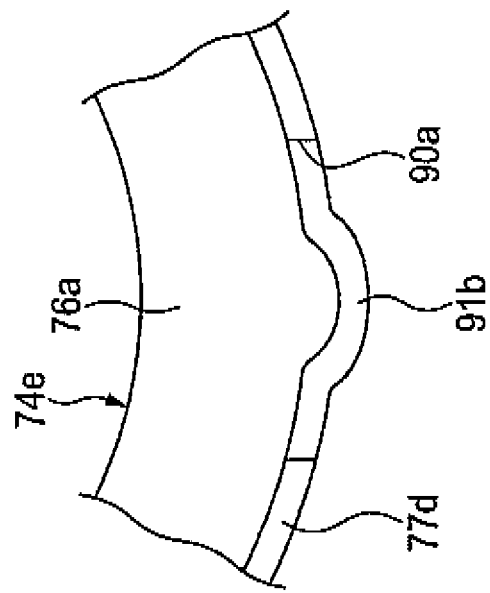
FIG. 12B is an orthographic projection thereof.

FIGS. 11 and 12 respectively show a thrust roller bearing according to a fifth embodiment of the invention. In the present embodiment, a cylindrical portion 77d which is formed in the outer circumferential edge of a race portion 76a of a race 74e, specifically, the base end portion thereof existing near the race portion 76a is formed to extend continuously over the whole periphery thereof. In other words, at the plurality of locations along the circumferential direction on the cylindrical portion 77d other than the base end portion thereof existing near the race portion 76a (the distal end portion to the axially intermediate portion of the cylindrical portion 77d), there are formed a plurality of cutout portions 90a respectively. Of the cylindrical portion 77d, in the circumferential direction intermediate portion of the uncut base end portion, there are formed race-retaining locking portions 91b respectively. To form the race-retaining locking portions 91b, of the base end portion of the cylindrical portion 77d, the portion the phase with respect to the circumferential direction of which coincides with the central portions of the respective cutout portions 90a may be expanded partially cylindrically in the opposite direction to the race portion 76a with respect to the radial direction of the cylindrical portion 77d.

In the present embodiment, the axial direction dimensions of the respective race-retaining locking portions 91b are longer than those of the previously described third and fourth embodiments. In correspondence to this, the width dimensions of a catching groove 82c to be formed in the inner circumferential surface deep end portion of the retaining recess 86a of a housing 85a are set wider than those of the third and fourth embodiments.

According to the structure of the present embodiment, the operation to work the respective race-retaining locking portions 91b can be carried out simultaneously with the working operation of the cylindrical portion 77d. Also, when the race-retaining locking portions 91b are worked, there is eliminated the possibility that an unreasonable force can be applied to metal molds. This makes it possible to secure but the durability of the working apparatus including the metal molds.

Also, according to the structure of the present embodiment, there is eliminated a possibility that the respective race-retaining locking portions 91b can collide with their mating members, thereby being able to prevent the race-retaining locking portions 91 from scratching or damaging their mating members.

Further, according to the structure of the present embodiment, when mounting the thrust roller bearing 71c including the race 74e into the retaining recess 86a, an unreasonable force can be made harder to be applied to the respective race-retaining locking portions 91b, thereby being able to prevent the race-retaining locking portions 91b against damage such a crack.

The structures and operations of the other remaining portions of the present embodiment are similar to those of the previously described third and fourth embodiments, and thus the duplicate description thereof is omitted here.

FIGS. 13A and 13B show a thrust roller bearing according to a sixth embodiment of the invention. In the present embodiment as well, of a cylindrical portion 77d, in the circumferential direction intermediate portion of the uncut base end portion thereof, there are formed race-retaining locking portions 91c respectively. The respective race-retaining locking portions 91c are formed such that they are expanded in a wedge-like manner in the opposite direction to the race portion 76a with respect to the radial direction. That is, the respective race-retaining locking portions 91c are inclined such that the projecting amounts thereof from the outer circumferential surface of the cylindrical portion 77d outwardly in the radial direction are small on the race portion 76a side and, as they become more distant from the race portion 76a, the projecting amounts increase. In the case of the thus structured race-retaining locking portions 91c, when compared with the previously described race-retaining locking portions 91b according to the fifth embodiment, an operation to engage the race-retaining locking portions 91c with the catching groove 82c (see FIG. 11) can be facilitated.

Also, similarly to the second embodiment, since the cylindrical portion 77d is formed by drawing a metal plate including portions which are respectively used to provide cutout portions and, at the same time, of the base end portion of the cylindrical portion 77d, the portion thereof the phase with respect to the circumferential direction of which coincides with the central portions of the respective cutout portions is expanded, the race-retaining locking portions 91c can be worked easily, and thus the cost of the race 74f can be reduced. In this embodiment as well, the bulging amount of the bulged portion can be adjusted by adjusting the size (the depth) of the respective cutouts.

The structures and operations of the other remaining portions of the present embodiment are similar to those of the previously described fifth embodiment, and thus the duplicate illustration and description thereof are omitted here.

Seventh Embodiment

Figure 14:
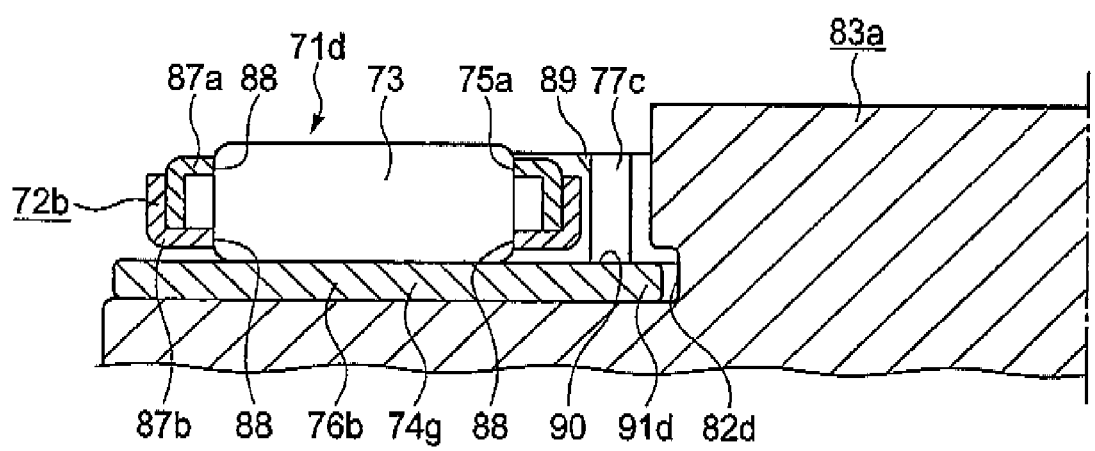
FIG. 14 is a sectional view of a half of a thrust roller bearing according to a seventh embodiment of the invention.
Figure 15:
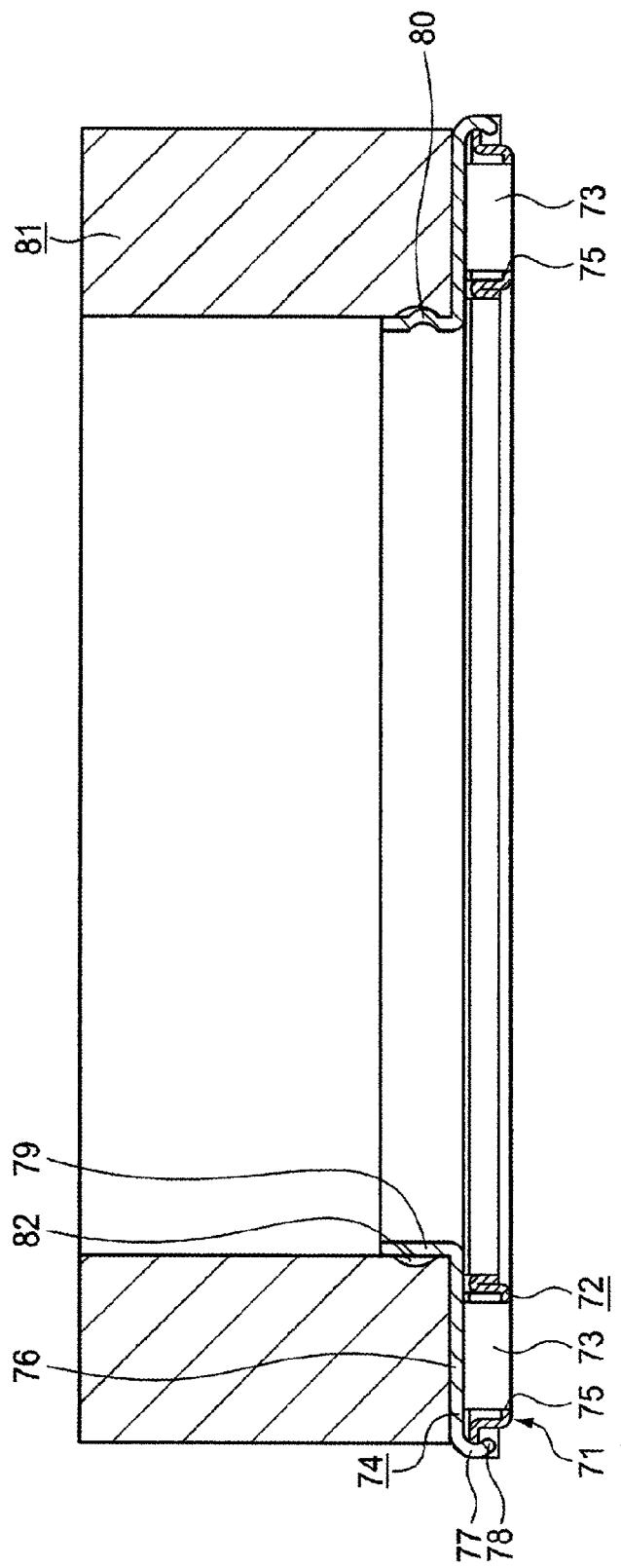
FIG. 15 is a sectional view of a first example of conventional structures.
Figure 16:
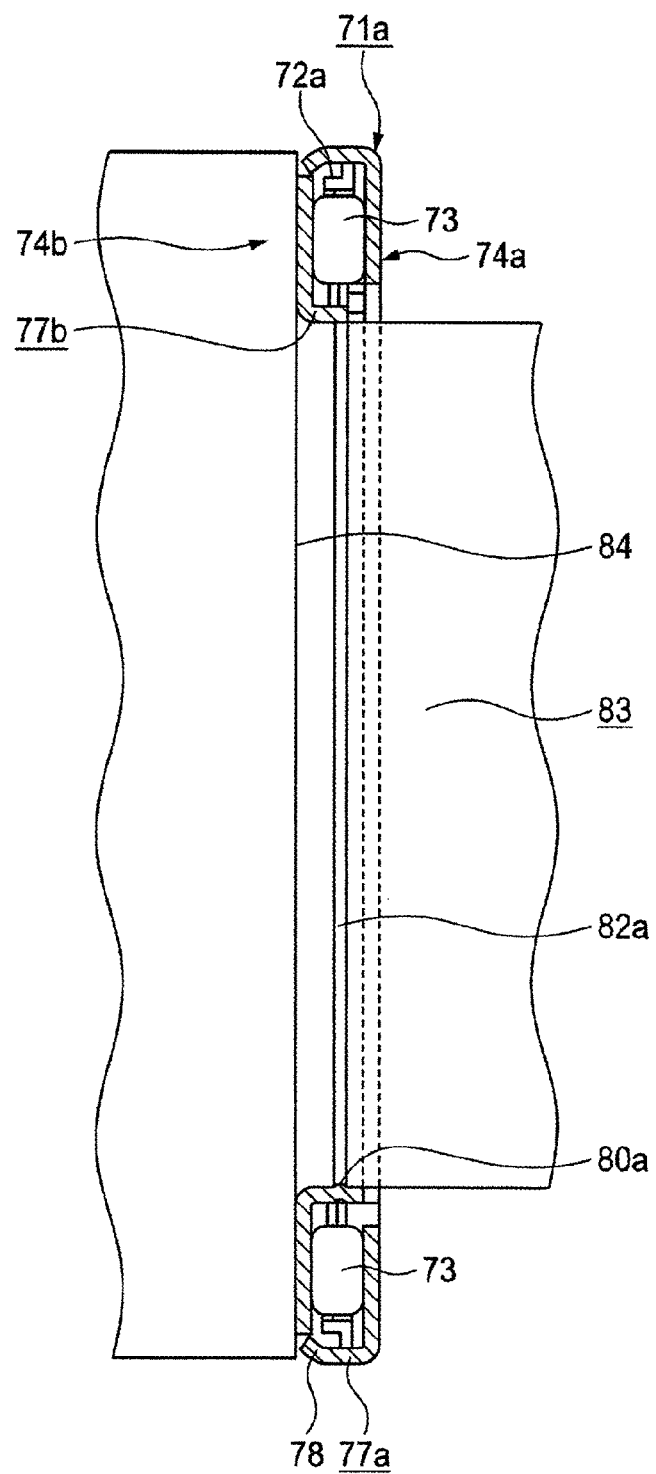
FIG. 16 is a sectional view of a second example of the conventional structures.
Figure 17B:
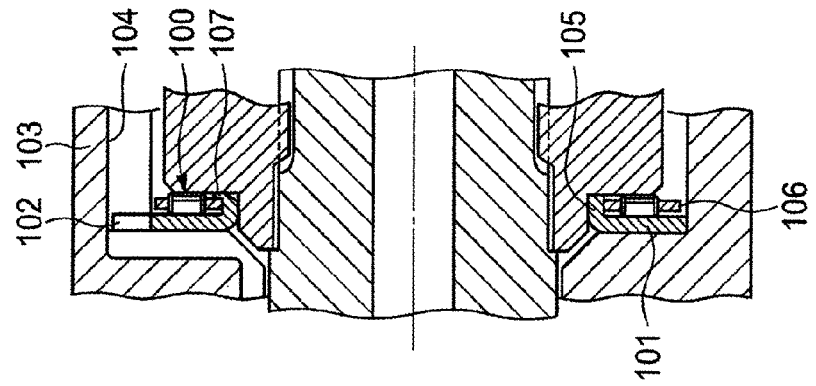
FIG. 17B is a sectional view taken along the line XVII-XVII of FIG. 17A.
Figure 17A:
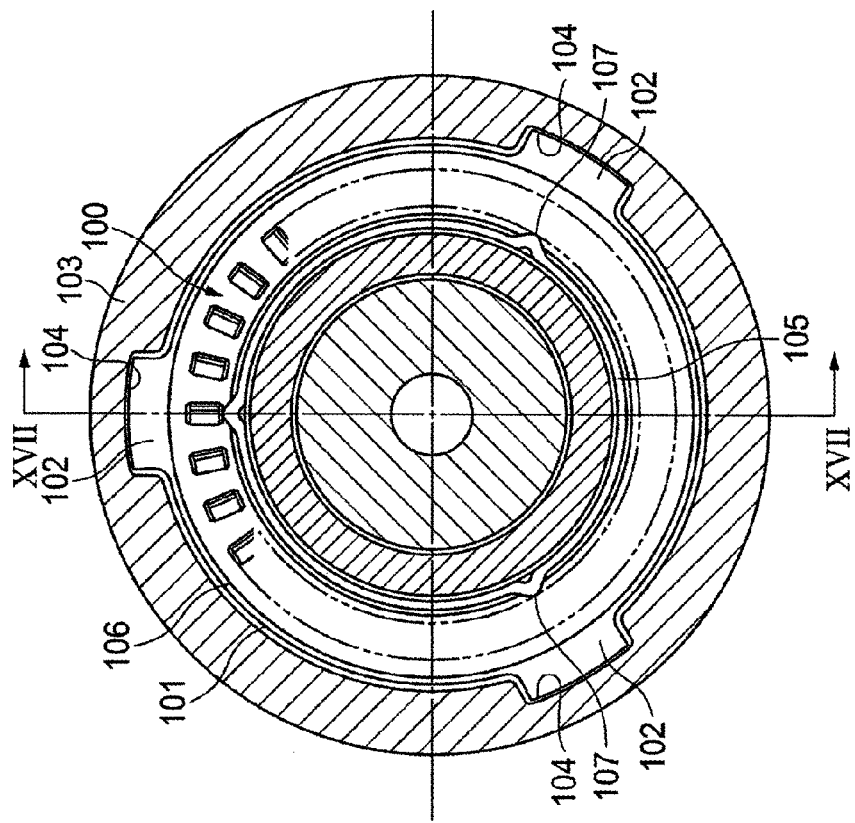
FIG. 17A is a sectional view of a thrust roller bearing disposed between an impeller and a stator of a conventional torque converter.

FIG. 14 shows a thrust roller bearing according to a seventh embodiment of the invention. In the present embodiment, a thrust roller bearing 71d is to be assembled to its mating member, that is, a shaft member 83a. For this purpose, in this embodiment, at the plurality of locations on the inner circumferential edge of a race portion 76b of a race 74g, there are formed race-retaining locking portions 91d respectively. These race-retaining locking portions 91d are respectively engaged into a catching groove 82d formed in the outer circumferential surface of the shaft member 83a, whereby the shaft member 83a and thrust roller bearing 71d including the race 74g can be prevented from separating from each other.

Except that the mating member is changed from the housing to the shaft member 83 and the inside and outside with respect to the radial direction thereof have been reversed, the structures and operations of the other remaining portions of the present embodiment are similar to those of the previously described third and fourth embodiments, and thus the duplicate description thereof is omitted here.

The present invention is not limited to the embodiments described above, and can be changed or modified as needed. The above embodiments can also be combined within the enable range.

As described above, the protrusions to be formed simultaneously with the formation of the cylindrical portion according to the invention may also have a rotation preventive function, and they may also have a function to position the thrust race in the axial direction thereof with respect to its mating member on which the thrust race is to be mounted. In both of the above cases, without increasing the number of manufacturing operations, such protrusions as are enhanced in rigidity can be formed, and thus the structure of the thrust race can be made compact.

For example, the shape of the cage is not limited to one employed according to the above embodiments but it may also be structured by a single piece of metal plate including a plurality of pockets punched along the circumferential direction thereof.

Also, a thrust roller bearing according to the invention may have at least a thrust race including protrusions. That is, the above-mentioned three to seventh embodiments respectively show a case in which the invention is applied to a structure having a race only on one side of the cage and rollers. Such structure can be implemented when a member to be disposed on the other side of the cage and roller is a member made of hard metal such as bearing steel and a track surface can be formed directly on the surface of this member. On the other hand, when two paired members respectively existing on both sides of the cage and rollers are made of relatively soft material such as an aluminum alloy, races are disposed on both sides of the cage and rollers. Also, in the case of the structure shown in FIG. 11, it can also be implemented even when the radial direction thereof is reversed.

Although the invention has been described heretofore specifically with respect to the specific embodiments thereof, it is apparent to those skilled in the art that various changes and modifications can be made therein without departing from the spirit and scope of the invention.

The present application is based on Japanese Patent Application No. 2009-102011 filed on Apr. 20, 2009 and Japanese Patent Application No. 2009-175081 filed on Jul. 28, 2009, contents of which are incorporated herein by reference.

EXPLANATION OF REFERENCE SIGNS 1, 1a, 71, 71a, 71b, 71c, 71d Thrust Roller Bearing
2, 73 Roller
3, 72, 72a, 72b Cage
4 First Thrust Race
5 Second Thrust Race
6, 76, 76a, 76b Race portion
7 Inside Cylindrical Portion (Cylindrical Portion)
8 Race portion
9 Outside Cylindrical Portion (Cylindrical Portion)
10, 10a Protrusion
20 First Member (Mating Member)
21 Second member (Mating Member)
74, 74a, 74b, 74c, 74d, 74e, 74f, 74g Thrust Race
75, 75a Pocket
77, 77a, 77b, 77c, 77d Cylindrical Portion
78 Locking Portion
79 Support Cylindrical Portion
80, 80a Fastening Protrusion
81 Hollow Shaft
82, 82a, 82b, 82c, 82d Catching Groove
83, 83a Shaft Member
84 Step Surface
85, 85a Housing
86, 86a Retaining Recess
87a, 87b Cage Element
88 Through Hole
89 Cage-retaining locking portion
90, 90a cutout Portion
91, 91a, 91b, 91c, 91d Race-retaining locking portion

The invention claimed is:

1. A thrust roller bearing comprising:
an annular cage having a plurality of pockets arranged at a plurality of first locations along a circumferential direction such that each of the pockets is oriented in a radial direction;
a plurality of rollers held inside the respective pockets in a rollable manner; and
at least one thrust race comprising an annular race portion on which a rolling surface of each of the rollers contacts in a rolling manner, and a cylindrical portion extending in an axial direction from a circumferential edge of the race portion toward a side on which the rollers are arranged,
wherein, at a plurality of second locations along the circumferential direction on the cylindrical portion, cutout portions are formed such that each of the cutout portions is recessed in the axial direction from a distal edge of the cylindrical portion toward the race portion to extend over an entire axial length of the cylindrical portion so that the cylindrical portion is discontinuous at the respective cutout portions, and a protrusion is provided to extend in the radial direction from a portion of the race portion where the cylindrical portion is discontinuous such that the protrusion protrudes in the radial direction from the cylindrical portion toward a side away from the race portion,
wherein the protrusion and the race portion are formed on a same plane, and
wherein the protrusion is configured to serve as a race-retaining locking portion to prevent the at least one thrust race from moving out from a mating member on which the at least one thrust race is mounted and
wherein the entire protrusion has a single unbent flat surface.

2. The thrust roller bearing as set forth in claim 1, wherein, at a plurality of third locations along the circumferential direction on the distal edge of the cylindrical portion, portions shifted in the circumferential direction from the cutout portions respectively are bent in the radial direction toward the side on which the rollers are arranged to form a cage-retaining locking portion to prevent the at least one thrust race and the cage from being separated.

* * * * *